April 5, 1955   K. A. OSTERBERG   2,705,384
SINKER FOR FISH LINE
Filed Jan. 26, 1952
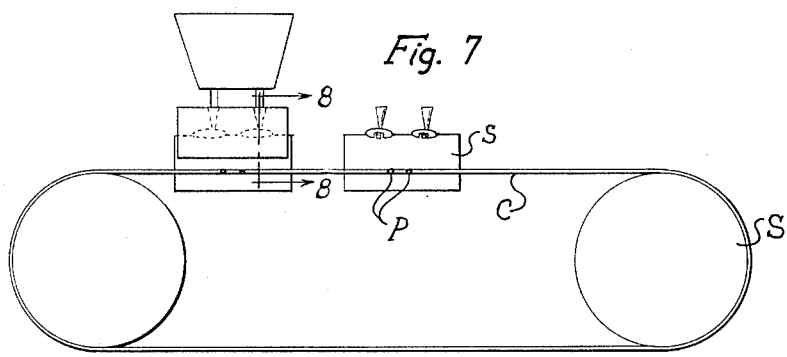
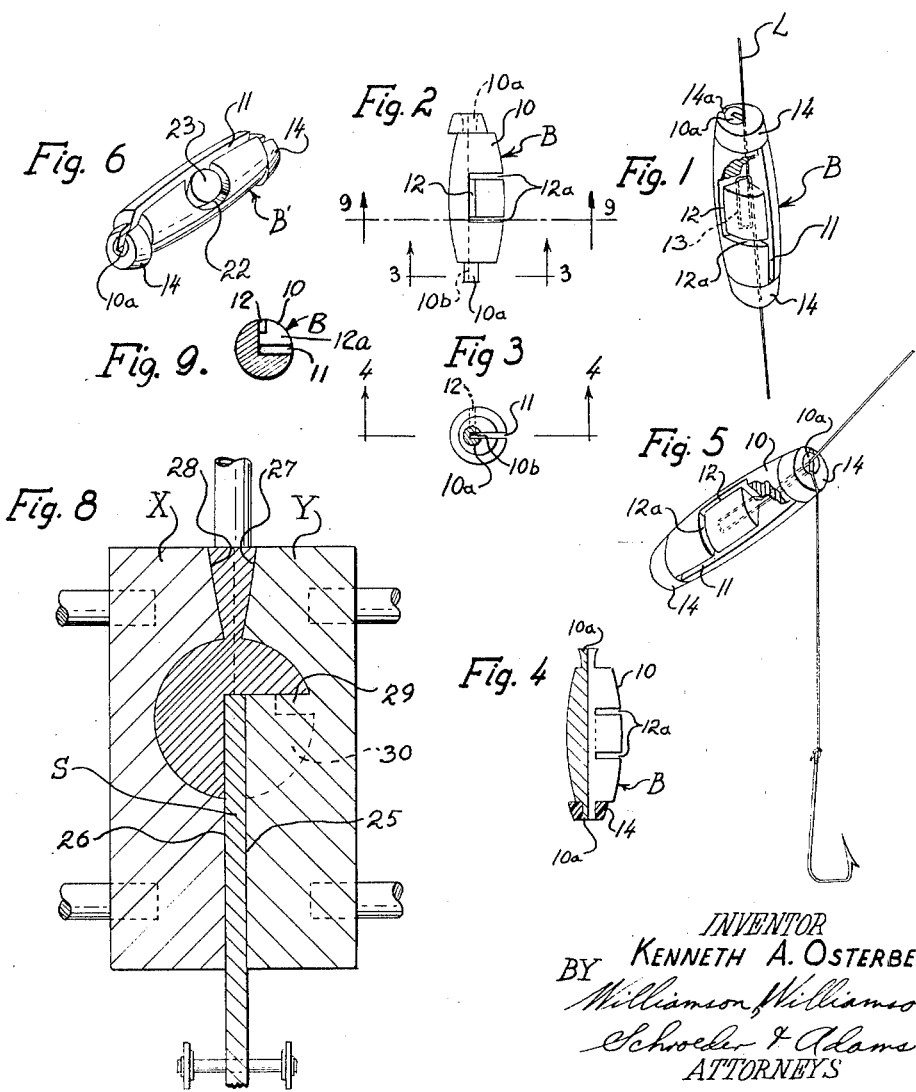
INVENTOR
KENNETH A. OSTERBERG
BY Williamson, Williamson,
Schroeder & Adams
ATTORNEYS

United States Patent Office

2,705,384
Patented Apr. 5, 1955

2,705,384

SINKER FOR FISH LINE

Kenneth A. Osterberg, Minneapolis, Minn.

Application January 26, 1952, Serial No. 268,394

5 Claims. (Cl. 43—44.9)

This invention relates to sinkers or weights for fish lines and particularly to sinkers of the type which may be readily applied to or removed from a line without threading the line therethrough and which may be readily adjusted upon the line without removal thereof.

Heretofore, sinkers have been quite widely employed constructed from lead or other readily bendable metal having a longitudinal line-receiving groove with bendable tongues or tabs at the ends of the body for encircling the line and securing the sinker. With such devices, the bendable tabs often break after reuse of the sinker and oftentimes the sinker will not retain its intended position upon the line.

Another type of readily attachable sinker has been employed utilizing a longitudinal and cylindrical channel within the body, which has therein a core of rubber or other compressible material whereby the line may be guided into the slot of the channel and thereafter worked behind the core member to retain the same. While such sinkers have been found useful, the retaining means is not positive and they sometimes become detached in use from the line and furthermore, over a period of time the rubber or other core member becomes stiff or impaired and will not perform its intended function in a satisfactory manner.

It is an object of my invention to provide a simple, comparatively inexpensive and highly efficient sinker for fish lines which may be readily attached to or removed from a line without in any way impairing the retaining or anchoring elements.

A further object is the provision of a sinker of the class described wherein the body is positively locked or secured to the line and will retain a predetermined set position while nevertheless making provision for slidable frictional adjustment on the line without adjusting or manipulating the retaining elements.

More specifically, it is an object to provide an efficient and highly improved sinker wherein a relatively deep longitudinal groove is provided in the body thereof for reception of the line and wherein a channel is cut from the periphery into the body of the sinker to define a snubbing post terminating substantially flush with the symmetrical periphery of the body to provide a frictional retaining and snubbing means for the line whereby a sinker may be readily applied and retained in the desired position upon the line during fishing.

A further object is the provision of a simple and efficient method for commercially molding and manufacturing the sinkers of my improved structure.

These and other objects and advantages of my invention will more fully appear from the following description made in connection with the accompanying drawings wherein like reference characters refer to similar parts throughout the several views and in which:

Fig. 1 is a perspective view with a portion of the body broken away showing an embodiment of my improved sinker attached in operative position to a fish line;

Fig. 2 is a side elevation of the sinker with the lower line-retaining-collar detached and the upper line-retaining-collar disposed in line-receiving position relatively to the body;

Fig. 3 is a cross section taken on the line 3—3 of Fig. 2 with however, the line-retaining collars attached and positioned in locked relation;

Fig. 4 is a longitudinal section of the sinker taken on the line 4—4 of Fig. 3;

Fig. 5 is a perspective view showing the application of my sinker in pendant style for trolling with a fish line;

Fig. 6 is a perspective view illustrating an alternative form of my invention;

Fig. 7 is a somewhat diagrammatical view illustrating apparatus and steps of a method for commercially molding and manufacturing sinkers of my improved construction;

Fig. 8 is a cross section taken through the mold and carrier plate of the apparatus shown in Fig. 7, and Figure 9 is a cross section taken on the line 9—9 of Figure 2.

Referring now to the form of the invention illustrated in Figs. 1 to 5 inclusive, I provide a body of preferably symmetrical and streamlined shape constructed from material having a much greater specific gravity than water and which is readily fusible or capable of being molded. Lead or lead alloys are preferable because of economy although it will be understood that other moldable or settable materials may be utilized including heavy plastics or plastics with heavy fillers. The body of my sinker indicated as an entirety by the letter B has preferably flat ends 10 extending normal to the axis of the body and beyond which extend integrally formed stub journals 10a which are axially aligned but which are disposed for very definite reasons eccentrically of the longitudinal center line or axis of body B.

The body B is provided with a relatively deep, straight, longitudinal slot 11 extending from end to end of the body and preferably being of a depth somewhat greater than the radius of the body and extending for a short distance longitudinally of the stub journals 10a. The stub journals are eccentrically arranged relative to the body so that the common axis thereof is aligned with the center line of the slot 11 as clearly shown in Fig. 1.

The medial portion of the body B is molded, cut or otherwise processed to form a channel 12 of encircling shape, as shown in Figs. 1 to 5 of U-shaped configuration and having the legs 12a or ends of the U in open communication with the longitudinal slot 11 of the body. The said encircling channel 12 comprises as shown, three intercommunicating slots, the intermediate one of which extends in a plane perpendicular to the plane generally defined by the longitudinal slot 11 but circumferentially spaced therefrom on the periphery of the body B. The two end slots 12a communicate at their inner ends with the intermediate slot of the channel and extend generally in planes normal to the axis of the body. The encircling channel 12 therefore, in cooperation with the medial portion of the longitudinal slot 11 defines a line-wrapping post 13 in the medial portion of the body, about which the fish line may be wrapped or coiled in one or more convolutions, as shown in Fig. 1, to anchor the sinker on the line while nevertheless permitting the sinker to be frictionally forced up or down the line for adjustment thereof. Because of the formation of the slots 11 and the intermediate portion of channel 12 along planes disposed angularly and substantially radially of the sinker, the post 13 is provided on two sides with converging or undercut shoulders for the purpose of effectively retaining a convolution of the line.

A pair of identical line-encircling and retaining collars 14 are frictionally journaled on the stub journals 10a at the ends of body B. These collars as shown, comprise split rings having longitudinal slots 14a therein which are adapted to register with the longitudinal slot 11 of body B. The collars are constructed of metal or plastic having a requisite degree of resiliency and are apertured cylindrically on axes eccentric to their peripheries, said axes lying in a plane common to the slots 14a and bisecting the cross sectional area of collars 14. The apertured portions of the collars 14 snugly fit and frictionally engage the stub journals 10a at the ends of body B and are retained thereon by means of flaring extremities 10b provided on the ends of the journals. When the collars 14 are turned to align their line-entering grooves 14a with the main longitudinal groove 11 of the body, the peripheries of the collars are disposed eccentrically of the axis of the body, as shown in Fig. 2. When the collars are thereafter turned approximately 180° to confine and encircle a fish line L the peripheries of the collars are concentric with the body B and preferably tapered in conformance with the streamlined body to form continuations thereof.

In Fig. 6, I have shown an alternative form of my invention similar in most respects to the form previously described and having the relatively deep longitudinal slot 11 formed in the body B' and having identical stub journals 10a provided with the identical eccentric line encircling and retaining collars 14. In this form, a circular, deep channel 22 is molded, cut or otherwise formed in the medial portion of body B' communicating along a portion thereof with the longitudinal line-receiving slot 11 and defining with said slot a line-wrapping post 23 which extends laterally of the body and has its extremity disposed substantially flush with the peripheral contour of the body adjacent thereto. The channel 22 is related to the body and to line-receiving slot 11 in a manner which positions the axis of post 23 at an acute angle to the slot 11 whereby the effect of an undercut or taper inwardly of the post is obtained to effectively retain one or more convolutions of the line.

In the use of my improved sinkers the line-encircling collars 14 are first turned to cause the line-receiving slots 14a thereof to register or become aligned with the main longitudinal slot 11 of the body. A portion of the fish line may then be readily slipped into the receiving slots or continuous slot then effected whereafter collars 14 are turned preferably through approximately 180° to lock and retain the line within the sinker. The sinker is then free to slide up and down the line and it may be used without wrapping of a portion about the posts 12 or 22, if a slide sinker is desired, where there is an abutment such as a swivel, leader or knot below the sinker on the line.

In most instances, it is desirable to retain the sinker in a predetermined position upon the line and to this end the bight of the line between the encircling collars 14 is slackened into a loop and that loop is turned and entrained about the post 13 or the post 23 of the form of sinker shown in Fig. 6 and thereafter, the line made taut to take up slack. The entraining of the line about the post may be readily accomplished after very little practice by guiding a loose portion of the line into and through the channel 12 or the channel 22 as the case may be. The line, instead of being entrained and coiled about the post may merely be snubbed about the post, if less friction and snubbing is desired, such as where a relatively coarse or heavy line is used. The line may also be coiled through more than one convolution about the post where a light and slippery line is employed and a greater degree of anchoring is desired.

With the line so coiled or snubbed as shown in Fig. 1 the sinker will be retained in a predetermined adjusted position on the line but may nevertheless be shifted longitudinally of the line by a pulling movement when adjustment is desired.

It is sometimes desirable to use a trolling or pendant sinker trailing the line in trolling and disposed in spaced relation to the hook. My device provides such a pendant sinker by installing the line as shown in Fig. 5. Here, the line is passed only through the slot 14a of the upper encircling collar of the sinker and into the upper portion of the longitudinal groove 11 and thereafter wound about post 13 and returned upwardly through slot 11 in doubled relation whereafter the collar 14 is turned to confine both ends of the line.

From the foregoing description it will be seen that the encircling collars 14 in their relation with the body B and with the stub journals 14 form positive means for guiding and retaining the sinker upon the line and will not wear or become fractured with extensive reuse. They will always, when turned to locked position, retain the line against displacement from the sinker body. The wrapping or entrainment of the line about the wrapping post is very easily and quickly accomplished and provides a means for frictionally retaining and/or snubbing the line to hold the sinker in a predetermined adjusted position while providing a ready means for longitudinally adjusting the sinker when desired.

It is important that the longitudinal slot 11 be formed in body B to a depth exceeding the radius of the body and that the stub journals 10a for mounting collars 14 be disposed eccentrically to the axis of the body for the following reason: when the line is received in longitudinal slot 11 and confined within the encircling collars, the eccentric apertures in collars 14 determine the position of the sinker relative to the line and with my construction, the sinker is disposed as shown in Fig. 1, as a plumb since the line assumes a position along the longitudinal center of gravity of the body with its attached collars 14. In this position it will be noted the line has almost passed out of the portions of the slot 11 defined in the journals 10a with the result that the weight hangs plumb.

In Figs. 7 and 8, an apparatus is diagrammatically illustrated for efficiently and commercially carrying out a novel and improved method of manufacture of the sinkers illustrated in Figs. 1 to 6 inclusive. To this end, an endless chain or carrier C is trained about a pair of wheels or sprockets S and has mounted thereon at closely spaced points P a series of carrier and slot forming plates S, each of said plates having outer straight edges upon which the sinkers are molded. Mechanism not shown is provided for progressing the chain or carrier, step by step, with short time intervals between the progressions. A two-part mold comprising sections X and Y is suitably suspended and mounted for displacement of the two sections X and Y and for compaction and uniting of the mold sections just prior to the pouring operation. The mold sections X and Y are provided with depending, vertical slots 25 and 26 respectively which cooperatively accommodate the plates S when one of said plates is stopped in a predetermined casting position. At such time, the mold sections are forced together as shown in Fig. 8. The mold sections contain cooperating mold cavities for casting one or more sinkers, which cavities enclose, when the mold is set, the upper edge of a portion of the slot-forming plate S. The molds include cooperating sprue portions 27 and 28 respectively, communicating with the upper and central portions of the mold cavities through which molten lead or other suitable metal may be poured. The mold section Y includes a narrow rib 29 which is disposed perpendicularly to the plate S and which consequently will withdraw from the molded product after the same is cast by horizontal displacement of the two mold sections. The mold section Y also includes a pair of vertical ribs 30 which are disposed at the ends of rib 29 for forming the end slots 12a in the channel 12 of the sinker, and which extend perpendicular to the rib 29. The side ribs 30 are of sufficient depth to properly assist in molding the side portions of the post 13.

In the operation of the apparatus shown in Figs. 7 and 8, the endless chain or carrier C is moved to a predetermined position and stopped, such as shown in Fig. 7 with one of the carrier plates S disposed between the then separated mold sections X and Y. The mold sections X and Y are then brought together upon the upper edge of the carrier plate cooperatively forming with the carrier plate the mold cavity. Thereafter, metal is poured into the sprue-forming passages 27 and 28, filling all cavities of the mold and of course, encircling and covering a portion of the upper edge of the carrier plate. The molten metal cools rapidly, affixing itself to the upper edge of the carrier plate whereafter the mold sections X and Y may be drawn apart and the endless chain or carrier progresses to a predetermined position and stops, bringing the next successive carrier plate in a position to receive between the mold sections X and Y. The sprues formed by the sprue portions 27 and 28 of the mold are subsequently broken off of the sinkers and the sinkers may be thereafter removed from the carrier plates for completion of my product.

From the foregoing description, it will be seen that I have provided a new and commercially efficient method of making a sinker and particularly the sinkers herein disclosed which consists in first moving a carrier and slot forming plate through a lineal course into a receiving position between a pair of spit mold sections with opposed cooperating mold recesses for forming the body of a sinker, then moving the mold sections together to engage at their lower portions the upper edges of the plate and to form therewith complete molding surfaces which include a second longitudinal rib provided by one of the sections and extending in angular relation to the upper edge of the plate. The same section includes a pair of transverse ribs at the end of the second longitudinal rib. The next step is the pouring of the fused metal into the mold cavity followed by the subsequent hardening of the molten metal and thereafter, the withdrawal horizontally of the two mold sections, leaving the casting impaled and attached to the upper edge of the carrying plate and providing in the casting, the elongated-line-receiving groove through the medium of the upper edge of the plate as well as the rectangularly arranged grooves formed by vertical ribs 30 and rib 29 which with the main line-receiving groove, defines the line-snubbing or encircling post 13.

Thus, by a very simple operation, through the use of mold sections which may be drawn apart horizontally, all of the portions of my improved sinker body, including the trunnion posts 10a, the longitudinal line-receiving groove 11 and the encircling channel 12, are formed in a molding process adapted to be caried out economically.

It will of course be understood that various minor changes may be made in the form, details and arrangement of parts of my improved sinker device without departing from the scope of the invention.

What I claim is:

1. A weight or sinker for fish lines comprising a symmetrical body constructed of a material substantially heavier than water, said body having a relatively deep longitudinal slot for receiving a fish line, said slot extending substantially radially of said body, said body having diminished extremities substantially alined with said slot and constituting a pair of journals at the ends of said body, a pair of split retaining collars each affixed to one of said journals and each having a slot which may be turned to registration with said longitudinal slot, means communicating with said longitudinal slot for frictionally snubbing a portion of a line confined in said slot and said journals being disposed eccentrically of the axis of said body to confine a line accommodated in said longitudinal slot and said collars axially of the length of said body.

2. A weight or sinker for fish lines comprising a symmetrical body constructed of a material substantially heavier than water, said body having a relatively deep longitudinal slot for receiving a fish line, said body having diminished extremities at the ends of said slot constituting a pair of journals, a pair of split retaining collars each affixed to one of said journals and each having a slot which may be turned to registration with said longitudinal slot and said body intermediate of its ends being provided with an encricling channel or groove communicating with said longitudinal slot and defining therewith a snubbing and anchoring post, the outer end of said post lying generally within the confines of the exterior of said body whereby a line accommodated in said slot may be trained about said post to retain the body in a desired position upon the line.

3. A weight for fish lines comprising a symmetrical, weight-body having a substantially straight, continuous, longitudinal slot extending in open relation from the periphery of said body throughout substantially the length thereof and inwardly radially of said body to at least the longitudinal axis thereof, means at each end of said body for engaging portions of a line to retain it axially within said body, said body at an intermediate portion thereof having a channel of encircling shape formed in communication with said longitudinal slot and at one side thereof and extending inwardly from the periphery of said body toward the axis thereof to define a laterally extending snubbing post, whereby a line at an intermediate portion may be trained and snubbed about said post from said slot to frictionally retain the body in a desired position upon the line while nevertheless permitting slidable and frictional adjustment of said body on the line.

4. The structure set forth in claim 3 wherein the outer end of said post terminates substantially flush with the adjacent periphery of said body and tapers inwardly from the outer end thereof.

5. The structure set forth in claim 3 wherein said post-forming-channel approximates a broadly annular shape.

References Cited in the file of this patent

UNITED STATES PATENTS

| Number | Name | Date |
|---|---|---|
| 231,417 | Foote | Aug. 24, 1880 |
| 326,134 | McNeal | Sept. 15, 1885 |
| 484,254 | Settle | Oct. 11, 1892 |
| 522,167 | Rawlings | June 26, 1894 |
| 1,883,574 | Cleeland | Oct. 18, 1932 |
| 2,287,848 | Wessel | June 30, 1942 |
| 2,435,505 | Morin | Feb. 3, 1948 |
| 2,459,287 | Robbins et al. | Jan. 18, 1949 |
| 2,571,808 | Aldinger, Jr. | Oct. 16, 1951 |